United States Patent [19]

Sebastian

[11] Patent Number: 4,617,788
[45] Date of Patent: Oct. 21, 1986

[54] LAWN MOWER LEAF MULCHING BLADE AND METHOD

[76] Inventor: Verne D. Sebastian, 4908 Kingswood Dr., Greensboro, N.C. 27410

[21] Appl. No.: 736,669

[22] Filed: May 22, 1985

[51] Int. Cl.[4] .......................................... A01D 55/18
[52] U.S. Cl. ....................................... 56/295; 56/503
[58] Field of Search ................. 56/295, 255, 17.5, 503

[56] References Cited

U.S. PATENT DOCUMENTS

| | | | |
|---|---|---|---|
| 2,751,737 | 6/1956 | Herod | 56/255 |
| 3,022,621 | 2/1962 | Zavarella | 56/295 |
| 3,104,510 | 9/1963 | Voigt | 56/295 |
| 3,452,524 | 7/1969 | Guetterman | 56/295 |
| 3,482,380 | 12/1969 | Stair | 56/295 |
| 3,538,692 | 11/1970 | Cope et al. | 56/295 |
| 3,780,509 | 12/1973 | Woelffer | 56/295 |
| 3,949,541 | 4/1976 | Henry | 56/295 |
| 3,998,037 | 12/1976 | Deans et al. | 56/296 |

Primary Examiner—Gene Mancene
Assistant Examiner—David I. Tarnoff

[57] ABSTRACT

A lawn mower blade having superior leaf mulching qualities is provided by placing V-shaped notches in each cutting edge of a conventional rotary lawn mower blade. The notches are positioned one-half (½) inch from the blade tip and have sides which measure three-sixteenths (3/16) of an inch in length. The notches are positioned with the axis perpendicular to the longitudinal axis of the blade.

6 Claims, 4 Drawing Figures

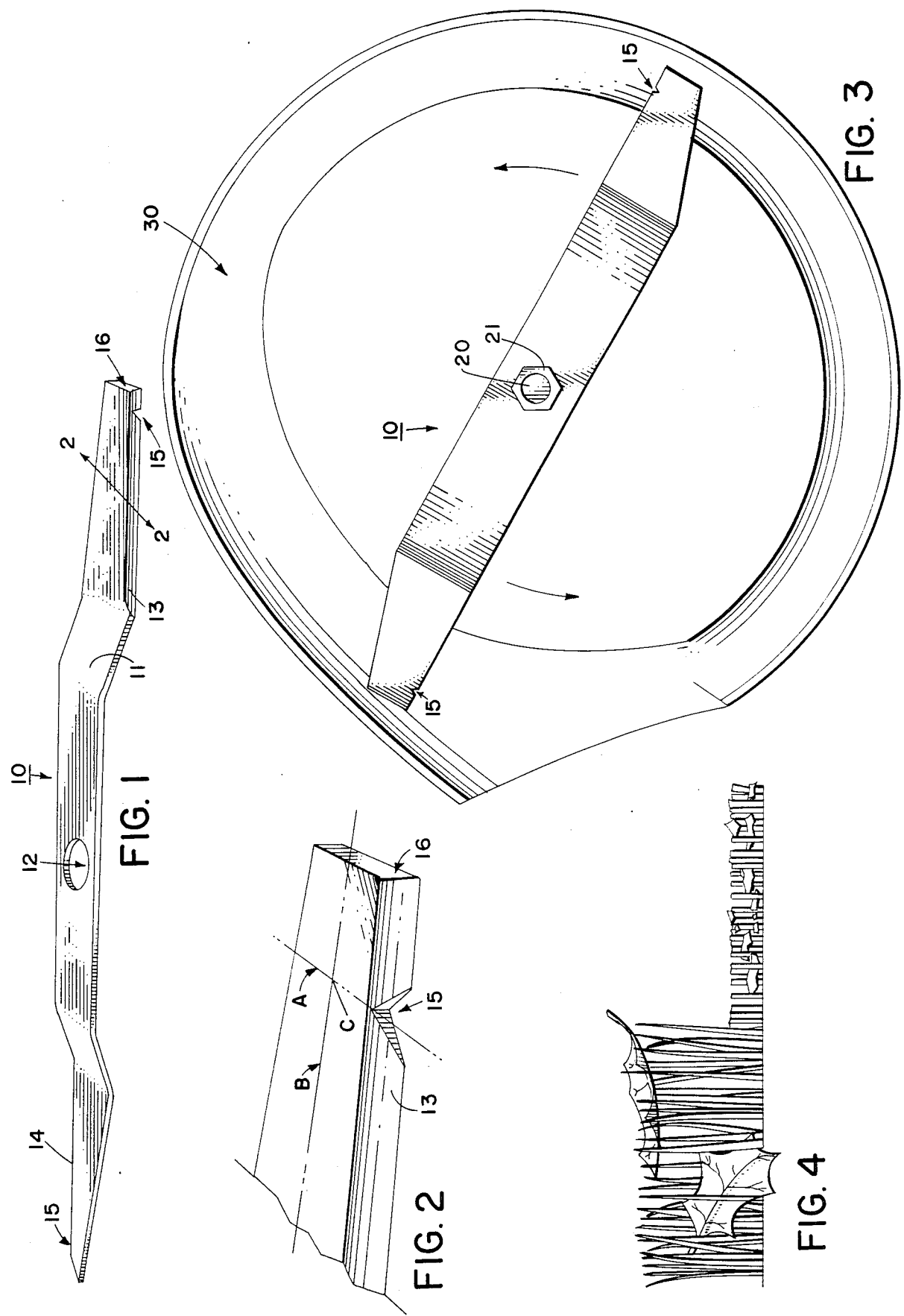

LAWN MOWER LEAF MULCHING BLADE AND METHOD

BACKGROUND OF THE INVENTION

1. Field of the Invention

The invention herein relates to a lawn mower blade which can be used to mulch leaves, twigs or the like and to cut grass during the operation of conventional rotary lawn mower. 2. Description of the Prior Art and Objective of the Invention Various rotary lawn mower blades have been utilized in the past to rid a lawn of leaves, twigs and other debris during the mowing process. Such an invention described in U.S. Pat. Nos. 3,998,037; 3,780,509 and 3,022,621. Such prior art devices may be somewhat effective but are generally more complicated to manufacture and may be useful only in limited applications.

With the disadvantages known to prior art devices, the present invention was conceived and one of its objectives is to provide a rotary lawn mower blade which will cut grass in a conventional manner and which will efficiently mulch leaves during the lawn mowing process.

It is yet another objective of the invention to provide a lawn mower blade which is easily manufactured and which is cost efficient for its operation.

It is still another objective of the invention to provide a method for mulching leaves which can be used with a variety of rotary lawn mower blades.

SUMMARY OF THE INVENTION

The aforesaid and other objectives of the invention are realized by a longitudinally-shaped rotary lawn mower blade having a pair of cutting edges wherein said cutting edges define a v-shaped notch approximately one-half (½) inch from the blade tip in each of the cutting edges. The v-shaped notch substantially defines an equilateral triangular shape wherein each side of the triangle measures three-sixteenths (3/16) inch in length. A blade so constructed allows the user to mulch leaves by passing the rotating blade over and through said leaves whereupon they are mulched and pulverized in a fast and efficient manner due in part to the air currents created within the cutting chamber of the lawn mower.

BRIEF DESCRIPTION OF THE DRAWINGS

FIG. 1 is a top front perspective view of a conventional lawn mower blade having v-shaped notches in accordance with the invention;

FIG. 2 demonstrates an enlarged view of the blade tip and notch;

FIG. 3 shows a bottom plan view of the blade positioned on a typical rotary lawn mower; and FIG. 4 illustrates a section of lawn with leaves before and after mowing with the blade of the present invention.

DESCRIPTION OF THE PREFERRED EMBODIMENTS

The preferred form of the lawn mower blade of the present invention comprises a substantially flat longitudinal blade formed from steel which includes a centrally positioned aperture for slidably mounting the blade on an engine shaft of a conventional gasoline or electric rotary lawn mower. Positioned in each cutting edge, approximately one-half (½) inch from the blade tip for maximum mulching capability is a v-shaped notch having sides of three-sixteenths (3/16) inches in length and being positioned with the axis of the v being perpendicular to the longitudinal axis of the blade.

The preferred method includes filing v-shaped notches in each cutting edge of a rotary lawn mower blade and passing the rotating blade through a quantity of leaves whereby said leaves are mulched while the grass is mowed.

DETAILED DESCRIPTION OF THE DRAWINGS

Turning now to the drawings FIG. 1 demonstrates a conventional lawn mower blade 10 which has been modified in accordance with the present invention. As shown, blade 10 consists of a longitudinal steel member 11 which defines a mounting aperture 12 for positioning on a conventional gasoline or electric lawn mower which is commonly used in the maintenance of grass lawns by homeowners and the like. Blade 10 includes right cutting edge 13 and left cutting edge 14 as shown in inverted fashion in FIG. 3.

Positioned in each of the two cutting edges is a v-shaped notch 15 shown in enlarged fashion in FIG. 2. Notch 15 as shown is v-shaped and is optimally positioned with its extreme edge one-half (½) inch from the tip 16. Notch 15 forms an opening shaped substantially as an equilateral triangle wherein all three sides of the imaginary triangle are three-sixteenths (3/16) of an inch in length. Notch 15 as further shown in FIG. 2 is positioned so that its axis A is perpendicular to the longitudinal axis B of blade 10 as shown at point C.

FIG. 3 depicts blade 10 mounted on a rotary lawn mower as seen from the bottom within cutting chamber 30 attached to motor shaft 20 by nut 21.

Although various notch positions, sizes and shapes have been tested, it has been determined that the positioning of the v-shaped notch at one-half (½) inch from the blade tip provides the most through and complete pulverizing of the leaves and if the notch is moved to another position as little as one-quarter (¼) inch from its optimum position or if its size is changed the mulching abliity of blade 10 is clearly diminished. Other shapes and sizes of rotary lawn mower blades other than the one shown herein have also been experimented with and it had been found that a "v" with sides of three-sixteenths (3/16) of an inch in length is the most effective when positioned one-half (½) inch from the blade tip 16 as shown in FIG. 2, regardless of the blade configuration as used with motors rated at approximately three (3) horsepower. The effect and effectiveness of blade 10 is shown in FIG. 4 which demonstrates in schematic fashion sections of a lawn with leaves before and after mowing with blade 10.

The method employed for effectively mulching leaves with a rotary lawn mower consist of filing a pair of v-shaped notches one-half (½) inch from each blade tip, said v-shaped notches having sides of three-sixteenths (3/16) of an inch in length and maintaining the notch with its axis perpendicular to the longitudinal axis of the blade. By positioning the blade notches, leaf mulching results are obtained as the lawn mower blade is directed over and through the grass containing leaves.

The illustrations and examples presented herein are for explanatory purposes and are not intened to limit the scope of the appended claims.

I claim:

1. A lawn mower blade for a rotary lawn mower comprising: a unitary longitudinal member, said member having a pair of cutting edges thereon, said cutting edges on opposite sides of said longitudinal member, said longitudinal member defining a mounting aperture, said aperture positioned between said cutting edges, each of said cutting edges having a notch consisting of one v-shaped notch, said notch defining a space shaped substantially as an equilateral triangle, and said notches positioned approximately ½ inch from each tip of said longitudinal member.

2. A lawn mower blade for a rotary lawn mower as claimed in claim 1 wherein said notches have a maximum width of 3/16 of an inch.

3. A lawn mower blade for a rotary lawn mower as claimed in claim 1 wherein said notches have sides of equal length.

4. A method of mulching leaves comprising: positioning a notch consisting of one v-shaped notch having side of equal length in the cutting edge of a unitary rotary lawn mower blade wherein said notch is ½ inch from the blade tip, attaching the blade to a rotary lawn mower, rotating the blade and passing the blade through a quantity of leaves whereby the leaves are mulched.

5. A method of mulching leaves as claimed in claim 4 wherein said notch forms an equilateral triangular space with each side of the triangle having a length of 3/16 of an inch.

6. A method of mulching leaves as claimed in claim 4 wherein positioning a v-shaped notch comprises the step of filing a v-shaped notch in the cutting edge of the lawn mower blade.

* * * * *